US006600985B2

(12) United States Patent
Weaver et al.

(10) Patent No.: US 6,600,985 B2
(45) Date of Patent: Jul. 29, 2003

(54) ROLL SENSOR SYSTEM FOR A VEHICLE

(75) Inventors: Ralph M. Weaver, Fishers, IN (US); Michael L. Miller, Carmel, IN (US)

(73) Assignee: Indiana Mills & Manufacturing, Inc., Westfield, IN (US)

(*) Notice: Subject to any disclaimer, the term of this patent is extended or adjusted under 35 U.S.C. 154(b) by 0 days.

(21) Appl. No.: 10/144,327

(22) Filed: May 13, 2002

(65) Prior Publication Data

US 2002/0165654 A1 Nov. 7, 2002

Related U.S. Application Data

(63) Continuation-in-part of application No. 09/817,624, filed on Mar. 26, 2001, now abandoned.

(51) Int. Cl.⁷ .......................... B60R 22/00; G06F 7/00; G06F 7/70; G06F 17/00
(52) U.S. Cl. .................. 701/45; 180/282; 280/735; 340/440; 340/438
(58) Field of Search .............................. 701/45, 1, 38; 180/282; 340/440, 438; 280/735, 756

(56) References Cited

U.S. PATENT DOCUMENTS

| | | |
|---|---|---|
| 3,899,028 A | 8/1975 | Morris et al. |
| 4,038,876 A | 8/1977 | Morris |
| 4,321,678 A | 3/1982 | Krogmann |
| 4,470,124 A | 9/1984 | Tagami et al. |
| 4,592,565 A | 6/1986 | Eagle |
| 4,691,798 A | 9/1987 | Engelbach |
| 4,879,658 A | 11/1989 | Takashima et al. |
| 4,882,689 A | 11/1989 | Aoki |
| 4,914,598 A | 4/1990 | Krogmann et al. |
| 5,065,612 A | 11/1991 | Ooka et al. |
| 5,115,238 A | 5/1992 | Shimizu et al. |
| 5,125,472 A | 6/1992 | Hara |
| 5,172,323 A | 12/1992 | Schmidt |
| 5,203,600 A | 4/1993 | Watanabe et al. |
| 5,233,213 A | 8/1993 | Marek |
| 5,261,506 A | 11/1993 | Jost |
| 5,270,959 A | 12/1993 | Matsuzaki et al. |
| 5,359,515 A | 10/1994 | Weller et al. |
| 5,369,580 A | 11/1994 | Monji et al. |
| 5,375,336 A | 12/1994 | Nakamura |
| 5,413,378 A | 5/1995 | Steffens, Jr. et al. |

(List continued on next page.)

OTHER PUBLICATIONS

"Evaluation Of Triggering Criteria For Car Occupant Protective Systems In Roll–Overs" by Ola Bostrom, Autoliv Research.
"Rollover Sensing for Heavy Trucks," UNAS GmbH.
"Rollover Sensing Rollover Modes," BOSCH, K8/EES 90706, pp. 23–31.
"Detection of incipient rollovers grows in importance," Automotive Engineering/Sep. 1997, pp. 94–96.
"Sensor development for occupant rollover protection," aei May 2001, pp. 66–69.

*Primary Examiner*—William A. Cuchlinski, Jr.
*Assistant Examiner*—Olga Hernandez
(74) *Attorney, Agent, or Firm*—Woodard, Emhardt, Moriarty McNett & Henry LLP

(57) ABSTRACT

A roll sensor system for a land vehicle is provided to determine when a vehicle roll condition has occurred and to trigger a safety system in response to that determination. In certain embodiments, an angular rate sensor is used to obtain an angular rate and, from the angular rate, an angle relative to the roll axis of the land vehicle. If the angular rate and the angle correspond to a safety system activation event, the roll sensor system will provide a trigger signal to the safety system. In some embodiments, the system includes an incline sensor(s) to aid in detecting and compensating for drift in the output of the angular rate sensor. In other embodiments the output of an angular rate sensor is used to validate the output of the incline sensor to aid in determining whether a vehicle safety system trigger event has occurred.

27 Claims, 9 Drawing Sheets

U.S. PATENT DOCUMENTS

| | | |
|---|---|---|
| 5,451,094 A | 9/1995 | Templin et al. |
| 5,492,368 A | 2/1996 | Pywell et al. |
| 5,573,269 A | 11/1996 | Gentry et al. |
| 5,590,736 A | 1/1997 | Morris et al. |
| 5,602,734 A | 2/1997 | Kithil |
| 5,626,359 A | 5/1997 | Steffens, Jr. et al. |
| 5,646,454 A | 7/1997 | Mattes et al. |
| 5,673,932 A | 10/1997 | Nitschke et al. |
| 5,684,336 A | 11/1997 | McCurdy |
| 5,684,701 A | 11/1997 | Breed |
| 5,699,256 A | 12/1997 | Shibuya et al. |
| 6,002,974 A | 12/1999 | Schiffmann |
| 6,002,975 A | 12/1999 | Schiffmann et al. |
| 6,038,495 A | 3/2000 | Schiffmann |
| 6,154,697 A | 11/2000 | Otsuka |
| 6,192,305 B1 | 2/2001 | Schiffmann |
| 6,212,455 B1 | 4/2001 | Weaver |
| 6,282,496 B1 | 8/2001 | Chowdhary |

ROLL SENSOR SYSTEM FOR A VEHICLE

REFERENCE TO RELATED U.S. PATENT

The present application is a continuation-in-part of U.S. patent application Ser. No. 09/817,624, filed Mar. 26, 2001, to the same inventive entity and entitled Roll Sensor System for a Vehicle and now abandoned.

BACKGROUND OF THE INVENTION

1. Field of the Invention

This invention relates to the field of roll sensors for vehicles. More particularly, the present inventions relate to the use of angular rate to determine a vehicle roll condition and to the use of angular rate sensors and incline sensors to accurately indicate that a land vehicle roll condition has occurred.

2. Description of the Prior Art

In the past it has been known to use accelerometers for detecting vehicle roll conditions. However, under certain conditions it would be desirable to use an angular rate sensor, alone or in combination with an incline sensor, to accurately anticipate a roll condition and to activate a safety system before the vehicle rolls over.

In the past, gyros have been used in land vehicles for the purpose of aiding in navigation. In these systems it has been found that over time, the output of the gyro drifts due to temperature and other factors. Extremely precise gyros which minimize drift are available, but can be very expensive. There have been patents in the past that have used gyros for navigation control of a vehicle, and which have established systems for compensating for the bias or drift in the gyro output. For example, U.S. Pat. No. 5,270,969 to Matsuzaki et al., entitled BIAS CORRECTION APPARATUS OF GYRO, discloses the use of a gyro, among other elements, in a vehicle navigation system, where the gyro output bias is corrected using a bias stored in the buffer memory during the time the vehicle is at a stop. Additionally, U.S. Pat. No. 4,321,678 to Krogmann uses a gyro to determine the position of a vehicle. In that patent an estimated value of the gyro drift is obtained in a filter by comparison with a magnetic heading and is taken into account.

There is a need for a land vehicle roll sensor system that can collect data and use logic to discern between roll and non roll conditions and provide for an accurate determination that a safety system trigger event has occurred.

These objects, and others, are satisfied by Applicant's present inventions disclosed herebelow.

SUMMARY OF THE INVENTION

One embodiment of the present inventions relates to the use of both angular rate and an angular rate derived angle to determine whether a vehicle safety system trigger event has occurred.

Other embodiments of the present inventions relate to the use of an angular rate sensor in a roll sensor system for a land vehicle to anticipate vehicle roll and to activate a vehicle safety system under roll conditions. In that embodiment, drift in the angular rate sensor output is compensated for periodically, including while the vehicle is in motion.

In other embodiments of the present inventions, a roll sensor system uses both an incline sensor and an angular rate sensor to accurately predict and detect vehicle roll conditions.

In other embodiments of the present inventions, to insure accuracy an incline sensor output and/or a signal derived from the incline sensor output is compared to a value obtained from and/or derived from an angular rate sensor output, to determine if the incline sensor output is valid. If valid, the incline sensor output is referenced in order to determine whether to trigger a vehicle safety system.

Related objects and advantages of the present invention will be apparent from the following description.

DESCRIPTION OF THE PREFERRED EMBODIMENTS

Figure 1:
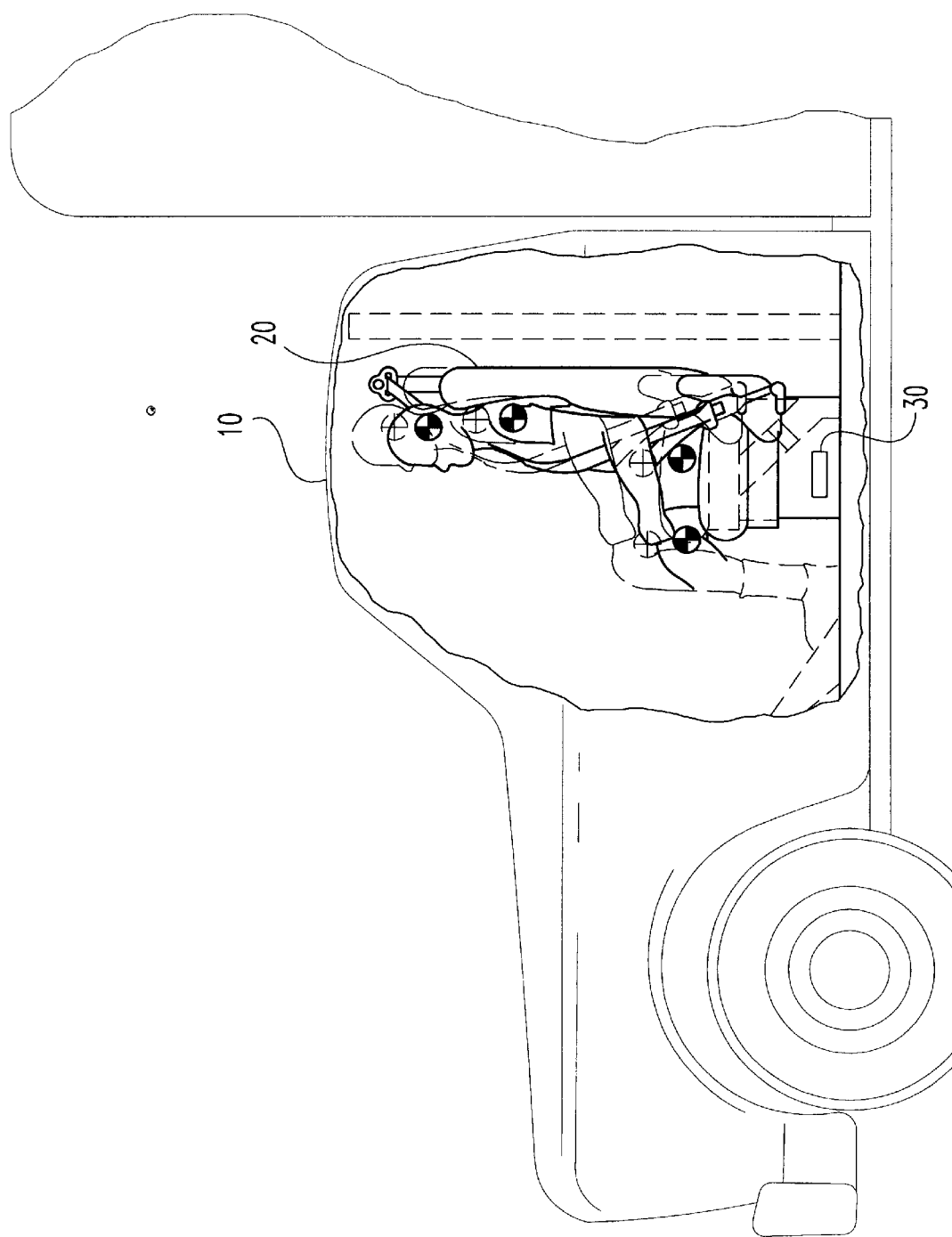
FIG. 1 there is shown a partial cut-away drawing of a commercial or heavy vehicle, such as a commercial vehicle heavy truck, including a safety system

For the purposes of promoting an understanding of the principles of the inventions, reference will now be made to the embodiments illustrated in the drawings and specific language will be used to describe the same. It will nevertheless be understood that no limitation of the scope of the inventions is thereby intended, such alterations and further modifications of the principles of the inventions as illustrated therein being contemplated as would normally occur to one skilled in the art to which the inventions relate.

Figure 2:
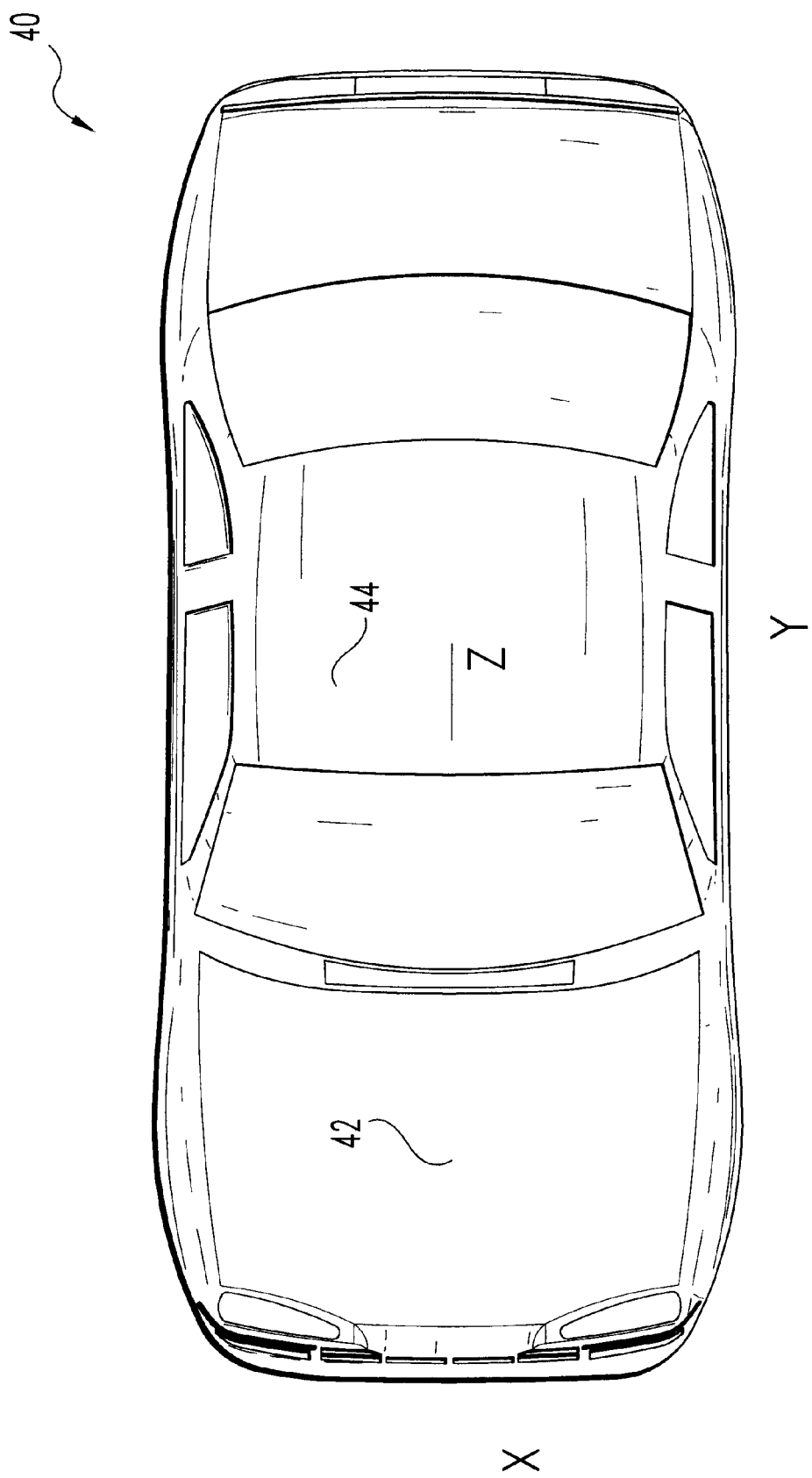
FIG. 2 is a top view of a vehicle having superimposed thereon directional axes.

Referring now to FIG. 1 there is shown a partial cut-away drawing of a commercial vehicle, such as a heavy truck 10, including a safety system 20. The present inventions may be used in any type of land vehicles, such as heavy trucks, heavy machinery (i.e. farm machinery or construction equipment), as well as occupant vehicles, as depicted in FIG. 2. Many of the vehicles of the above listed types include safety systems, such as pretensioners, seat belts and air bags. The present inventions may be used to activate such safety systems upon a determination by the roll sensor system 30 that the vehicle is rolling over. A determination by the roll sensor system, as explained herebelow, that the vehicle is rolling about at least one roll axis, and that activation of the vehicle safety system is desired as a result, is referred to herein as a trigger event or activation event.

One safety system useful with the current inventions is disclosed in U.S. Pat. No. 5,451,094 to Templin et al., that patent incorporated herein by reference in its entirety. The Templin et al. patent discloses a seat and safety system for moving a vehicle seat and occupant toward the vehicle floor upon the determination of certain vehicle conditions. However, the Templin et al. patent is merely one example of a safety system useful with the present inventions. Although not shown, other safety systems, such as pretensioners, forward, side panel air bag, and/or ceiling air bags may be activated instead of, or in addition to, the above described safety system, if desired. FIG. 1 shows a safety system including a movable seat as disclosed in the Templin et al. patent.

Referring now to FIG. 2, there is shown a passenger vehicle 40, in which the present inventions may be used. A longitudinal X-axis 42 runs through the length of the vehicle 40. Perpendicular to the X-axis 42, a longitudinal Y-axis 44 which runs through the width of the vehicle 40. Additionally depicted is a Z-axis, perpendicular to both the X-axis 42 and the Y-axis 44 in the z-plane of FIG. 2. For purposes of the present inventions, the X-axis 42 may additionally be referred to herein as the "X roll axis" of the vehicle, while the Y-axis 44 may, optionally, be monitored as an additional Y roll axis. Both the X-axis and Y-axis are fixed parallel to the earth's surface or a ground plane, as a reference.

Figure 3:
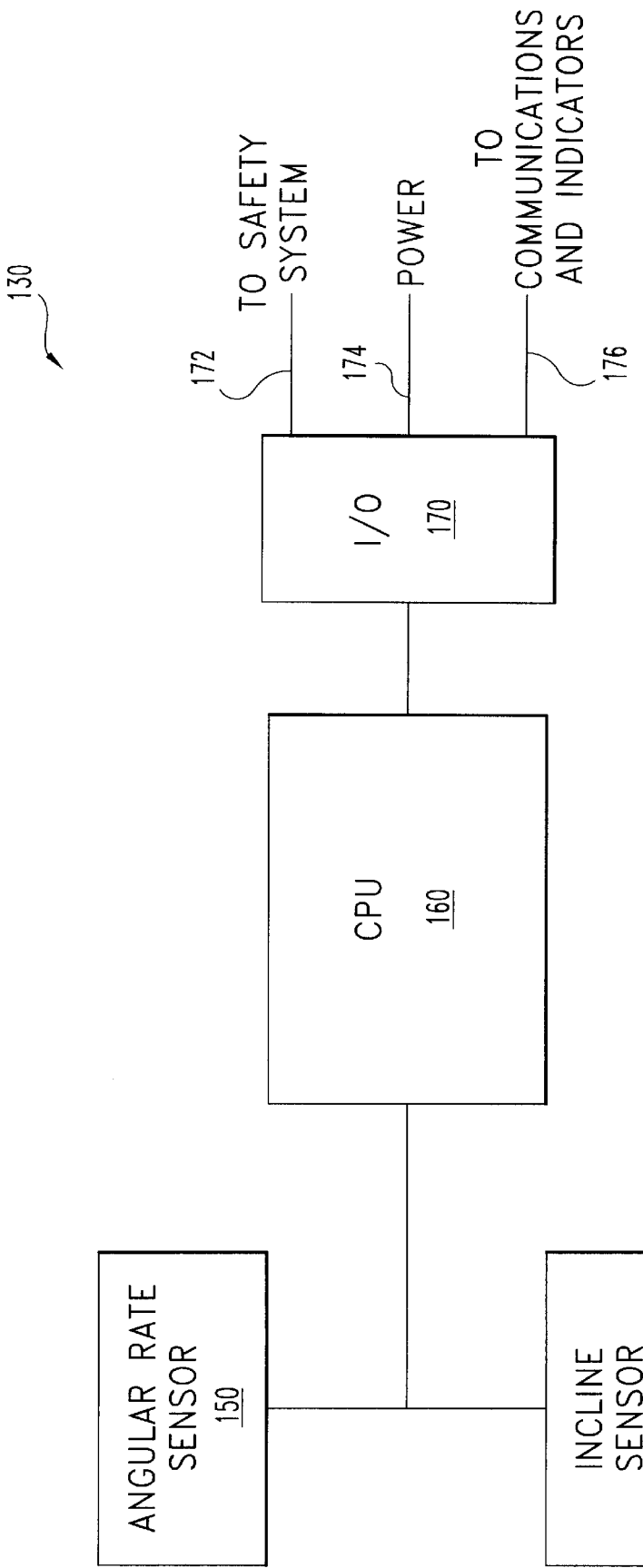
FIG. 3 is a block diagram of a roll sensor system useful in connection with a safety system.

Referring now to FIG. 3, there is shown a block diagram of a roll sensor system 30 which may be used in a vehicle to activate a safety system, such as is shown in FIG. 1. The roll sensor system 30 may be mounted beneath the occupant seat floor board of the vehicle (20 of FIG. 1), preferably beneath the occupant or driver. The roll sensor system 30 includes an angular rate sensor 150 which is mounted to the vehicle such as to be sensitive to motion around the X-axis (42 of FIG. 2) of the vehicle. Optionally, a second angular rate sensor (not shown) may be mounted to the vehicle as to be sensitive to motion around the Y-axis (44 of FIG. 2).

The angular rate sensor 150 continuously provides an output representative of an angular rate of motion around the X roll axis 42 of the vehicle to the CPU. Both the angular rate sensor 150 and the CPU 160 may be powered by the vehicle battery, or may alternatively include a separate power supply. If the vehicle battery is used to power the roll sensor system 30, power is first supplied to the system when the vehicle ignition is started via the power line 174 into the input/output controller 170. The distal end of power line 174 is connected to a power supply (not shown). Further, the input/output controller 170 is in electrical communication with the safety system deployment control unit (additionally not shown), via line 172. Thus, the CPU 160 may transmit a trigger signal to the deployment control unit(s) (DCU), via the I/O unit 170, when the safety system is to be deployed. Optionally, the input/output controller 170 may provide an output signal via signal line 176 to a diagnostic system, which is used to monitor the functionality of the roll sensor system 30, and to indicators on the dashboard, if desired.

Any suitable angular rate sensor from which an angular rate determination can be made, may be used as angular rate sensor 150 of FIG. 3. For example, in one embodiment of the present invention, a solid state gyro is used to produce the angular rate. However, this is not meant to be limiting, as other devices for determining angular rate are known, and may be used in connection with the present invention, including other solid state devices. For purposes of the present example, the angular rate sensor 150 is of a type which produces a voltage representative of an angular rate of change around the vehicle's X roll axis. As stated above, the angular rate around an additional Y roll axis may also be monitored, if desired. One such angular rate sensor which may be used with the present invention is described in U.S. Pat. No. 5,375,336, to Nakamura, which patent is incorporated herein by reference in its entirety. To obtain the angular rate, voltage readings are periodically obtained by the CPU 160 from the angular rate sensor 150. For example, in one such angular rate sensor, initially the gyro voltage output is nominally 2.50V. As the angular rate goes to +80 deg/sec, the output goes to 5.00V. As the output goes to −80 deg/sec, the output goes to 0.00V.

Additionally, the present vehicle roll sensor system 30, may include an incline sensor 140 to provide a voltage representative of a tilt or incline signal to the CPU 160. Any appropriate incline sensor, such as an accelerometer that can measure accelerations due to gravity along an axis, may be chosen as the incline sensor 140. For purposes of this embodiment of the present invention, incline sensor 140 may be chosen to be an accelerometer, such as the ADXL202 sold by ANALOG DEVICES. The ADXL202 may be mounted so that it is sensitive along the Y-axis 44 and is perpendicular to the force of gravity. Due to this relationship, when the vehicle is on a flat surface the output of the ADXL202 accelerometer is 0G. For example, using the ADXL202, when the vehicle is tilted around the X-axis, and in a direction along the −Y-axis, the output varies in a known way from 0G to −1.00G, depending on the degree of tilt (−1.00G corresponding to −90 degrees relative to the Y-axis). Correspondingly, when the vehicle is tilted around the X-axis in the direction opposite the first direction, the output varies from 0G to +1.00G, depending on the degree of tilt (+1.00G corresponding to 90 degrees relative to the Y-axis). Additionally, the particular exemplary accelerometer may additionally be aligned to produce an output representative of incline relative to the Y-axis of the vehicle (in addition to an X-axis output), if desired. The features of the above-named accelerometer will be used herein as an example, but this is not meant to be limiting, as other accelerometers and/or incline sensors may be used with the present embodiment of the inventions. Further, alternatively, two or more separate incline sensors may be used to detect incline relative to other axes, if desired.

The roll sensor system 30 of FIG. 3 operates as follows. The CPU 160 receives an input signal representative of an angular rate from the angular rate sensor 150 and an input signal representative of the vehicle's incline angle along the Y-axis (about the X-axis) from the incline sensor 140. As noted above, additional sources of angular rate and incline signals (not shown in FIG. 3) may be provided to detect roll about the Y-axis, if desired. The operation of those devices would be the same as described in connection with the angular rate sensor 150 and the incline sensor 140. The CPU 160 makes a determination based upon the signals from the angular rate sensor and the incline sensor to determine whether a vehicle roll condition is occurring or that a roll is imminent. Upon such a determination, the CPU 160 transmits an activation signal to the safety system, via the I/O device and line 172

Figure 4:
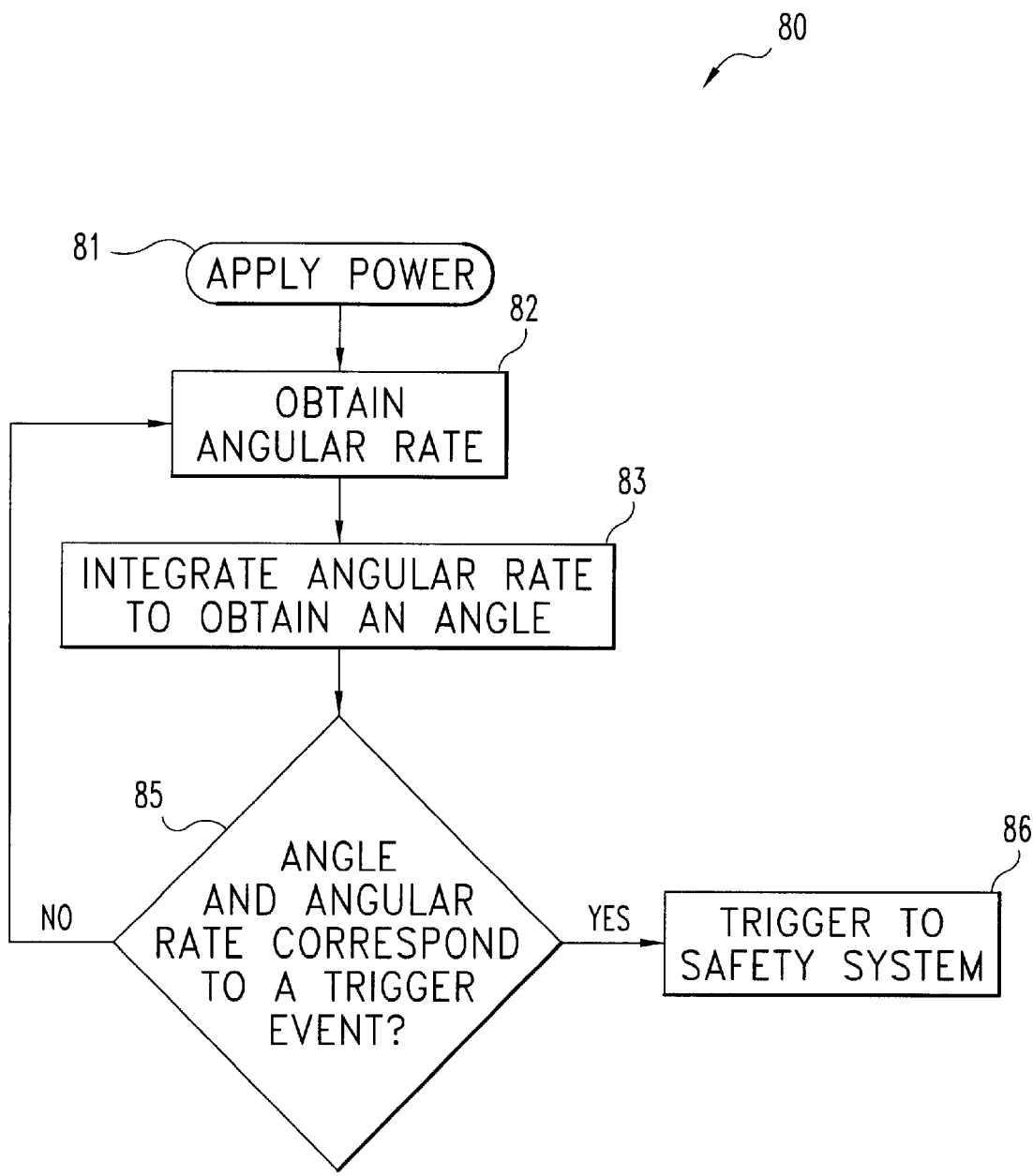
FIG. 4 is a flow diagram of the operation of one roll sensor.

A first embodiment of the present inventions will now be discussed more particularly in connection with FIGS. 3 and 4. Referring to FIGS. 3 and 4, first, power is applied to the roll sensor system 30 (step 81). The angular rate sensor 150 can only determine the roll rate by determining a change from an initial angle to a present angle. In the first few seconds of power being applied to the roll sensor system 30, the initial output value from the angular rate sensor is averaged multiple times (i.e. 50–100 times per second) to obtain an initial angular rate sensor offset voltage representative of the average initial gyro offset value. This initial angular rate sensor offset voltage reading, $V_0$, is stored in memory at the CPU 160.

After the initial angular rate sensor offset value is stored, a first angular rate sensor output voltage is provided to the CPU 160. In the present example, the CPU 160 determines the angular rate sensor angular rate by subtracting the angular rate sensor offset value $V_0$ from the current angular rate sensor output V (step 82). As explained above, these voltages are representative of the angular rate of the angular rate sensor around the x, or roll, axis of the vehicle, in that the difference $V-V_0$ is representative of the change in the angular rate sensor/vehicle angle from the time power is initially applied.

As shown in step 83, the CPU 60 uses the voltage signals representative of the angular rate obtained from the angular rate sensor output and integrates over time to determine the angular rate sensor/vehicle angle relative to the X-axis. In general, the CPU 160 determines the vehicle angle relative to the X-axis using the following:

$$\propto = \Sigma R \times t \qquad (1)$$

where $\propto$=angle, R=angular rate, and t=time.

More specifically, the CPU determines the angle by the following:

$$\propto = \sum \frac{(V-V_0)}{C} \times \frac{1}{S} \qquad (2)$$

where $\propto$=angle, V=angular rate sensor voltage reading, $V_0$=initial resting voltage, C=angular rate sensor gain constant, and S=sampling rate. The angular rate sensor gain constant C is individually determined for each angular rate sensor 150 and is a value set at the factory. The sampling rate S is in the range of between once and one thousand times per second. Preferably, the angular rate sensor voltage is sampled between 25 and 200 times per second. More preferably, the angular rate sensor voltage will be sampled between 50–100 times per second. In the present example, the angular rate sensor voltage is sampled 100 times per second. The factory determined constants C and S can be combined to yield the following:

$$\propto = \sum \frac{(V-V_0)}{G} \qquad (3)$$

where $\propto$=angle, V=angular rate sensor voltage reading, $V_0$=initial resting voltage, G=gain, with the gain, G, calculated and set at the factory during production. The summation occurs for each sample over the period of time that power is applied. If the angular rate sensor is used by itself, when power is first applied to the system 30, the summation angular rate sensor angular rate accumulator value is set to zero in the CPU 160. If, as in the present embodiment of FIG. 3, the angular rate sensor 150 is used in connection with an incline sensor to help determine angular rate sensor drift, the initial accumulator value may be set using an initial detected value from the incline sensor.

After the accumulator value is set, for each sample thereafter the angular rate sensor rate $(V-V_0)$ is added to the value of the angular rate sensor accumulator, which is stored as the new angular rate sensor accumulator value. After which the current angular rate sensor angle is obtained by dividing the angular rate sensor accumulator value by the angular rate sensor gain G (set at the factory as explained above), which converts the angular rate to an angle.

Then, both the angle (derived from the angular rate signal) and the signal representative of the angular rate $(V-V_0)$ for the current voltage V, are calculated by the CPU 160. If both the present calculated angle and the current angular rate determined in step 82 are determined to correspond to a vehicle roll condition or a safety system trigger event, then a signal is sent by the CPU 160 to the safety system deployment control unit (DCU) to activate the safety system. Angular rate and angle may correspond to a trigger event if they equal or exceed certain threshold values stored in the CPU 160. In one embodiment, safety system trigger event angles and angular rates are correlated in a lookup table that is stored in memory accessible by the CPU 160. However, it is not intended that the inventions be limited only to the use of a lookup table, as other means of storing information to determine a trigger event are contemplated by the present inventions. For example, the angle and angular rate may be appropriately weighted using a formula and calculated in the CPU, the result of which, if exceeding a predetermined threshold, would correspond to a safety system trigger event.

The deployment control unit may be of a type known in the art, to control deployment of the safety system, and may be used to activate a pyrotechnic gas generator, a source of pressurized fluid, and/or other known safety system activators, including those shown in U.S. Pat. No. 5,451,094 previously incorporated herein by reference.

If the angular rate derived angle and the signal representative of the current angular rate do not correspond to a trigger event, the roll sensor system 130 returns to step 82 to calculate the new current angular rate and repeats the process from steps 82–85. Thus the new angular rate is added to the accumulated angular rate value and divided by the gain G, and the resulting angle and the new angular rate signal are used by the CPU 160 to determine whether a safety system trigger event has occurred. This cycle is repeated for the entire period that power is supplied to the roll sensor system 130, or until a trigger event signal has been generated.

By using both angle and angular rate to determine when to trigger the vehicle safety system, no single variable is determinative in anticipating a roll condition. In this way the response to different roll angle/angular rate combinations can be varied and planned for by formula or in a look up table. For example, by using both angle and angular rate from the angular rate sensor, a look-up table can be programmed to generate a trigger event signal even though the angular rate sensor angle is small, if it is determined that the signal representative of the angular rate is large, and thus the vehicle is rolling over quickly. Additionally, a system's look up table may be set to generate a trigger signal for the converse, a larger angular rate sensor angle, but a slower angular rate. Thus, by using both angle and angular rate, different trigger points can be set so that a quickly rolling vehicle (large $V-V_0$) can trigger at an earlier point in the roll (smaller relative angle $\propto$), than that of a more slowly rolling vehicle (small $V-V_0$). This gives the slower rolling vehicle an opportunity to possibly correct itself before triggering the safety system.

Additionally, it is known that the output of most angular rate sensors drift over time, as a result of temperature and other variations. As the present system integrates the signal representative of the angular rate over time, any rate error due to drift is continually added to the angle, thus rendering a small rate error into a large integration error. Thus, as stated above, the drift compensated roll sensor system 30 (FIGS. 1 and 3) includes an incline sensor 140 in addition to an angular rate sensor 150.

In the present embodiment, the incline sensor 140 is mounted to be sensitive along the Y-axis, so as to provide a non-zero output when the vehicle is tilted around its X-axis in the +/−Y direction. However, as stated herein, optionally, the incline sensor chosen may additionally be sensitive along other axes, for example, to provide a second output signal when the vehicle is tilted around the Y-axis in the +/−X direction. Likewise, a second incline sensor may be used to provide an output signal representative of incline around the Y-axis, in the +/−X direction. In such a case, a second angular rate sensor (similar to angular rate sensor 150) would be provided to produce an angular rate output sensitive about the Y-axis. The output from the second angular rate sensor, and the incline signal in the +/−X direction would additionally be provided to the CPU 160. The operation of those devices would be virtually identical to that described herein in connection with the angular rate sensor 150 and incline sensor 140, in connection with the present embodiment.

The incline sensor 140 may be used to determine, among other things, the initial incline angle of the vehicle relative to the Y-axis, when power is initially supplied to the roll sensor system 130. Additionally, signals from the incline sensor 140 may be used by the CPU 160 to compensate for drift the angular rate sensor may experience over time. When using an incline sensor 140 in accordance with the present embodiment, the angular rate sensor output drift may be compensated for while the vehicle is in motion.

When power is first applied to the roll sensor system 130, the angular rate sensor 150 has no fixed reference. Thus an initial angular rate sensor output is provided irrespective of any incline to which the vehicle may initially be subject. As stated above, in one particular example an angular rate sensor may have an initial voltage output of nominally 2.50V. As the angular rate goes to +80 deg/sec, the output goes to 5.00V. As the angular rate goes to −80 deg/sec, the output goes to 0.00V. Any subsequent voltage change in the angular rate sensor output would correspond to change from the angular rate sensor's initial position or could be the result of drift.

Figure 5:
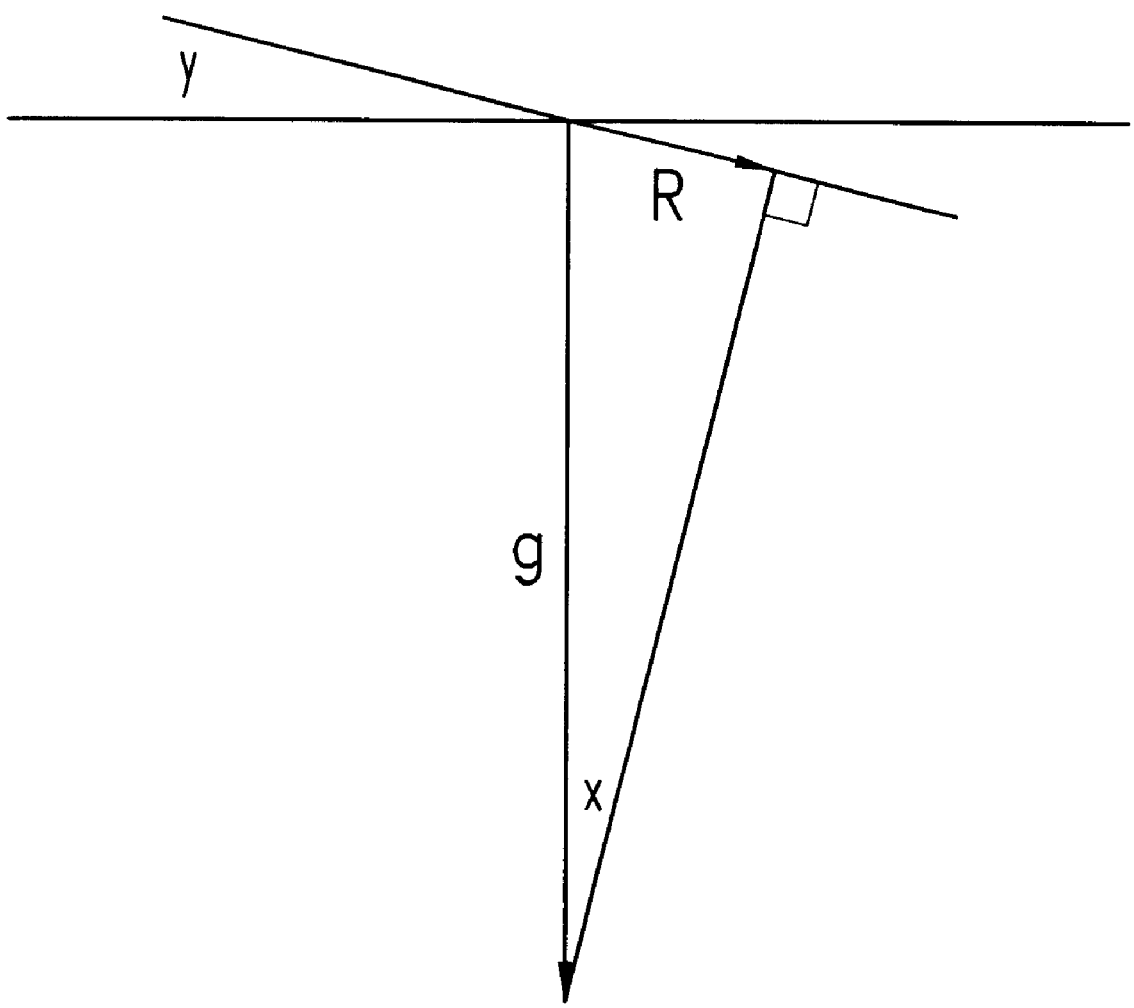
FIG. 5 is a diagram showing certain geometric relationships between a roll angle and a detected angle.

Using the incline sensor 140, initial angular rate sensor angle can be determined as follows. Referring to FIG. 5, if the incline sensor or accelerometer is mounted so that it is sensitive along the Y-axis 44 of the vehicle, then the initial vehicle angle A=arcsin (Y), where Y is the acceleration in Gs sensed by the accelerometer. In FIG. 5, the angle A corresponds to the vehicle roll angle relative to the Y-axis 44, which, as stated above, is maintained parallel to the ground. Additionally, g is the acceleration due to gravity. Y is the amount of G's sensed by the accelerometer along the Y-axis. Thus, initially, when power is first supplied to the roll sensor system 130, when the vehicle is at rest, an initial starting angle for the vehicle tilt can be determined using the incline sensor 140. This initial tilt angle A stored in memory in the CPU 160 to provide a reference for use in combination with the angular rate sensor output to determine vehicle tilt. In one embodiment, the initial tilt angle A is multiplied by the factory set angular rate sensor Gain factor G, and is stored as the initial angular rate sensor accumulator value, so as to provide an initial reference angle for the angular rate sensor.

Additionally, while the vehicle is in operation, drift in the angular rate sensor output, from angular rate sensor 150, can be compensated for in the CPU 160 using the output of incline sensor 140. For example, the detected angle of incline sensor 140 is provided to the CPU 160, where it is compared to the calculated angular rate sensor angle. In one embodiment of the present inventions, to compensate for lateral accelerations which average out to 0 long term, the output of the incline sensor 140 is averaged over a long period of time and the result is used to correct the angular rate sensor drift. For example, rather than the current incline sensor angle (which can be prone to wide variation from moment to moment) being compared to the calculated angular rate sensor angle, a value of the incline sensor 140 which is averaged over time with the previous averaged incline sensor angles, is compared to the calculated angular rate sensor output angle. Alternatively, as will be discussed more fully below in connection with FIG. 8, a current incline sensor angle, free of a lateral acceleration component, may be derived and used in place of the averaged incline sensor angle. If the two calculated angles differ by greater than a predetermined amount, the angular rate sensor angle is adjusted by a portion of the difference between the angular rate sensor angle and the averaged incline sensor angle to compensate for drift. This drift compensated angular rate sensor angle is used to determine whether a safety system trigger event has occurred.

Alternatively, at certain times, for example, when the current incline sensor angle is equal to zero, any net angle output from the angular rate sensor 150 is determined to be drift, and the amount of drift is stored in the CPU 160. This drift value is subtracted from the angular rate sensor 150 output angle value in order to compensate for the drift. Additionally, as will be described below in connection with FIG. 6, in the present embodiment, the angular rate sensor output value is averaged over a long period of time and is used to update the initial angular rate sensor offset reading used in determining the angular rate sensor angular rate.

As described above, after a drift compensated angular rate sensor angle is obtained, the CPU 160 analyzes at least that angle to determine whether it is appropriate to activate a safety device. In one preferred embodiment of the present invention, both the angular rate sensor rate and the drift compensated angular rate sensor angle are analyzed in the CPU 160 and a determination is made as to whether a safety system trigger event has occurred. As stated above, the system may use a preset look-up table stored in memory accessible by the CPU, or the CPU may perform calculations to determine the occasion of a safety system trigger event. If the CPU 160 determines that both angle and angular rate correspond to an event where activation of the safety system would be desirable, then a trigger signal is sent, via the input/output (I/O) device 170, to the deployment control unit(s) which activates the safety system using a pyrotechnic gas generator, or some other known safety activation device. In the present embodiment, although an incline sensor may be used to determine initial angular rate sensor angle and/or drift, the incline sensor output is not used directly to trigger a safety system. Rather, angular rate and angular rate sensor angle, both derived from the angular rate sensor, although possibly adjusted using the incline sensor value, are used to determine whether to trigger the safety system.

Figure 6:
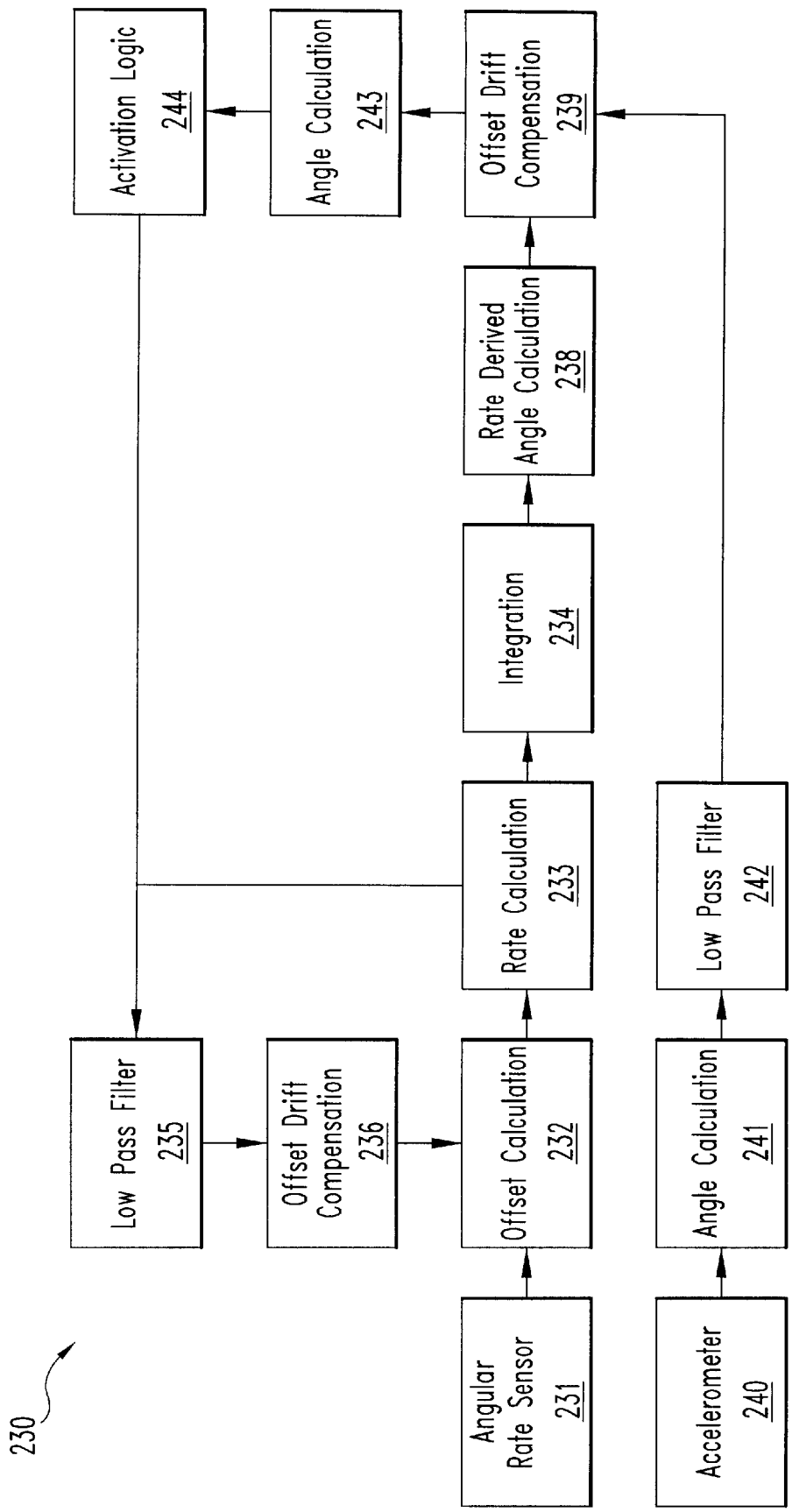
FIG. 6 is a flow diagram of the operation of one embodiment of a roll sensor system.

Referring now to FIG. 6, there is shown a flow diagram 230 of the particular operation of a roll sensor system, such as the roll sensor system 30 described herein. The roll sensor system includes an angular rate sensor, which is, in the present embodiment, preferably a solid state angular rate sensor, such as a solid state gyro, and an incline sensor for determining the position of a vehicle relative to the roll axis. Initially, when power is first provided, an angular rate sensor 231 provides a voltage output representative of the initial angular rate sensor output voltage to the processing circuitry.

In step 232, the processing circuitry stores and averages the initial few angular rate sensor output voltages for about the first few seconds that power is applied to the roll sensor system. The average voltage obtained in this first period of time is stored as the angular rate sensor initial voltage or angular rate sensor offset voltage.

After an angular rate sensor offset voltage is initially stored, the processor calculates the angular rate sensor rate in step 233. Angular rate sensor rate is calculated as the raw angular rate sensor output value minus the stored angular rate sensor offset value.

As shown in FIG. 6, the angular rate sensor rate calculated in step 233 is then provided for use in steps 234, 235 and 244. In steps 234 and 238, the angular rate sensor rate is integrated over time and the angle is calculated as described above in connection with equations (1)–(3). More specifically, upon power initially being provided to the roll sensor system, the processor sets an angular rate sensor accumulator value to be equal to the angular rate sensor gain (which is a preset factory calibration value used to convert an angular rate sensor reading to an angle, as described above in connection with equations (1)–(3)) multiplied by the accelerator angle. This provides the processor with an initial reference angle for the angular rate sensor. Subsequently, the angular rate sensor accumulator value is updated in steps 234 and 238 by adding the angular rate sensor rate (which is the raw angular rate sensor output value minus the angular rate sensor offset value) to the existing angular rate sensor accumulator value. Then the angular rate sensor angle is determined in step 238 by dividing the angular rate sensor accumulator value by the angular rate sensor gain. This angular rate sensor angle is provided to step 239 so that the offset drift can be calculated and removed.

At the same time that the angular rate sensor is providing output information to the processor, an incline sensor, which, in the present embodiment is the accelerometer in step 240, provides a voltage output to the processor. Alternatively, as will be discussed further in connection with FIGS. 8 and 9, two incline sensors may be used to calculate a current incline angle representative of the instantaneous tilt of the vehicle along an incline axis and free of the lateral acceleration component. In step 241, the processor converts the accelerometer output voltage to an angle. In one embodiment, the accelerometer angle is calculated as follows:

$$\text{accel. angle} = \operatorname{asin}((\text{accel. value} - \text{accel. offset}) * \text{accel. gain}) \quad (4)$$

where the accelerometer value is the raw, current reading from the accelerometer and where the accelerometer offset and the accelerometer gain are factory set calibration values used to convert accelerometer reading to angle. Then, the resulting accelerometer angle is low pass filtered in step 242, the result of which the processor uses to calculate the offset drift component value, for purposes of compensating for the angular rate sensor drift.

As noted above in connection with FIG. 5, the accelerometer angle resulting from the low pass filter is averaged with all previous accelerometer angle readings and the average value is compared to the angular rate sensor angle value resulting from step 238. If the difference between the two angles is greater than a preset value, the difference is attributed to drift. In step 243, a drift compensated angular rate sensor angle is calculated, where the angle value calculated in step 239 attributable to drift is subtracted from the angular rate sensor angle calculated in steps 234 and 238.

In step 244, of the present embodiment, the processor compares the drift compensated angular rate sensor angle derived in step 243 and the angular rate sensor rate calculated in step 233 to a preset lookup table. In the particular operation of the embodiment of FIG. 6, a look up table is utilized to determine whether a safety system trigger event has occurred. If the angle and rate both correspond to a safety device trigger event, as set forth in the lookup table, then the processor sends a signal to the safety system deployment control unit(s). The safety system may be of the type described in U.S. Pat. No. 5,451,094 to Templin et al., or may include pretensioners, standard occupant air bags, or other known safety systems. If the rate and angle do not correspond to a trigger event, then the process continues by obtaining a new raw angular rate sensor reading in step 231 and a new raw accelerometer reading in step 240.

As stated above in connection with FIG. 5, the angular rate sensor value is additionally averaged over a long period of time and used to update the angular rate sensor initial value, or angular rate sensor offset value, used in step 232. As shown in FIG. 6, the rate calculated in step 233 is low pass filtered in step 235. If the output voltage representative of the angular rate sensor rate in step 233 is within a certain range of the angular rate sensor offset value, than the new angular rate sensor offset value is set to be the low pass filtered angular rate sensor rate. Additionally, if a new angular rate sensor offset value is stored, the angular rate sensor accumulator value is additionally updated as follows:

$$\text{angular rate sensor accumulator} = \text{angular rate sensor accumulator} - F3(\text{angular rate sensor rate} - \text{angular rate sensor offset}) \quad (5)$$

where F3 represents an additional low pass filter function and the angular rate sensor offset is the newly calculated angular rate sensor offset value.

Thus, there is described a roll sensor system for activating a safety system upon the occurrence of a roll-over trigger event detected using an angular rate sensor. As described above, the angular rate from the angular rate sensor, as well as the roll angle derived from the angular rate, may be used to determine when to trigger the safety system in a land vehicle. Additionally, as described herein, there is provided a roll sensor system including an angular rate sensor to detect roll angle and roll rate, wherein initial angular rate sensor angle and angular rate sensor drift are compensated for using an incline sensor, but wherein the output of the incline sensor is not directly used to trigger the safety system. Additionally, the drift compensation calculation can occur accurately while the vehicle is in motion.

Optionally, if a precise angular rate sensor is used which is not subject to drift, the incline sensor (140 of FIG. 3) may be omitted. In such a system, the CPU 160 predicts and/or determines the occurrence of a vehicle roll condition using the angular rate from the angular rate sensor, and integrating it over time to determine the vehicle angle. The CPU (160 of FIG. 3) would then generate a trigger event signal based on the angular rate and angular rate derived angle, as described above. However, in such an embodiment it may still be desirable to provide an incline sensor to determine the initial vehicle angle with respect to the desired roll axis.

In another embodiment of the present inventions, there is provided a vehicle roll sensor system, such as is shown in FIGS. 1 and 3, wherein the incline sensor output is used to determine whether a safety system trigger event has occurred, and wherein the angular rate sensor is used to provide a check mechanism for the incline sensor. For example, under certain high G turn conditions, lateral acceleration experienced by the incline sensor can artificially indicate a vehicle roll angle of some significance. To compensate for this in the presently described vehicle roll sensor system, the incline sensor angle is used to activate a safety system only if found to be valid relative to an angle derived from the angular rate sensor signal.

Figure 7:
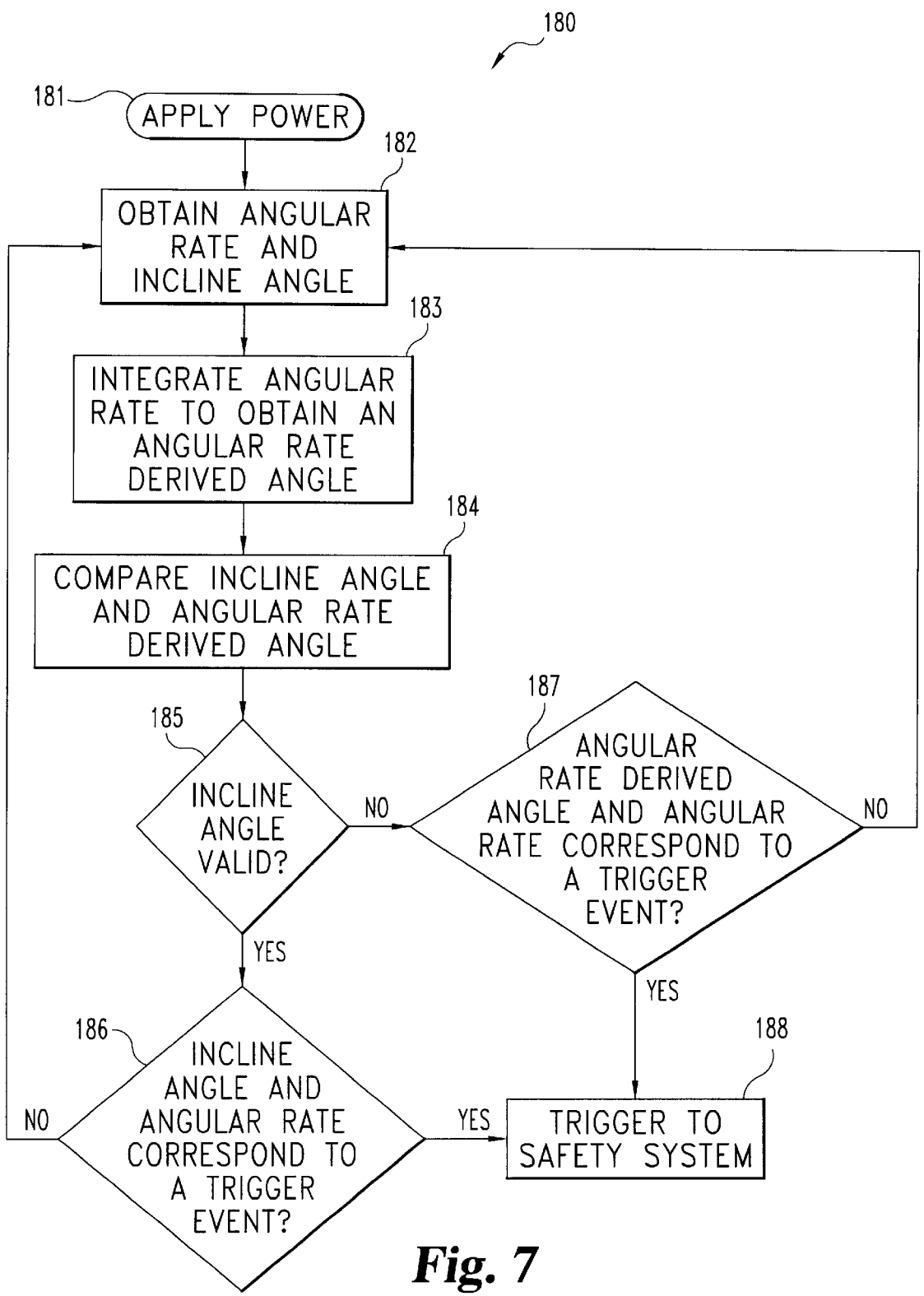
FIG. 7 is a flow diagram of the operation of one embodiment of a roll sensor system.

For example, referring now to FIG. 7, there is shown a flow diagram 180 of another embodiment of the present inventions. As in the earlier described embodiment described in connection with FIG. 6, when power is applied to the system(step 181), the incline sensor angle and the angular rate from the angular rate sensor are obtained (step 182). The incline sensor angle may be used to provide an initial vehicle angle to the CPU 160, as described above in connection with FIG. 5. This initial vehicle angle would be stored for use with the angular rate sensor output from the angular rate sensor 150.

The CPU 160 receives the angular rate signal from the angular rate sensor 150 and integrates it over time, as described above, to obtain an angular rate derived angle (step 183). The CPU 160 is continuously monitoring the output of the incline sensor 160 to determine the vehicle incline angle from the incline sensor. Additionally, the CPU compares the vehicle incline angle with the angular rate derived angle (step 184). If the discrepancy between the two values is below a predetermined validity threshold value, the CPU determines that the incline sensor output is valid (step 185). When valid, the incline sensor output may be used to determine whether a vehicle safety system trigger event has occurred (step 186). For example, if the incline angle is greater than a threshold value, and is additionally found to be valid by comparison to the angular rate derived angle, the CPU 160 may cause a safety system trigger signal to be generated. In the present embodiment, the incline angle signal used may be either the instantaneous measured incline angle, or a filtered, averaged incline angle signal, as desired. Optionally, as depicted in step 186, if desired, the angular rate may additionally be used in combination with the incline angle, if found to be valid, to determine whether a trigger event has occurred. For example, after the incline angle is found to be valid, the CPU 160 may compare the incline angle and the angular rate from the angular rate sensor to a lookup table, or may calculate whether a trigger event has occurred using a formula. However, it is understood that, if desired, step 186 could use only the incline angle to determine whether a safety system trigger event has occurred.

If the CPU 160 determines that the comparison between the angular rate derived angle and the incline sensor angle is greater than a predetermined threshold amount, the incline sensor angle is determined to be invalid. Optionally, the CPU may look to the angular rate derived angle and/or the angular rate to determine if a trigger event has occurred (step 187).

Additionally, as described above in connection with the embodiment of FIG. 6, the incline angle, while found to be valid in comparison to the angular rate derived angle, may be averaged over time and used to compensate for drift in the angular rate sensor output caused by external factors.

Alternatively, instead of comparing the incline angle to an angular rate derived angle, as described in connection step 183 of FIG. 7, the incline angle may be differentiated (current incline angle–averaged previous incline angles/preset time period) over short periods of time to obtain an incline angle derived rate. Then, rather than the two angles being compared in step 184, the incline angle derived rate may be compared to the instantaneous output of the angular rate sensor to determine if the incline angle is valid. If the difference between the incline angle derived rate and the instantaneous angular rate is less than a predetermined threshold value, the incline angle may be used by the CPU to determine whether a safety system trigger event has occurred. If the difference is greater than a predetermined threshold value, the incline angle is determined to be invalid. If invalid, the CPU 160 may then integrate to obtain an angular rate derived angle and use that and/or the angular rate to determine if a safety system trigger event has occurred, or may use some other means. By using the instantaneous angular rate from the angular rate sensor, it becomes unnecessary to compensate for drift in the angular rate sensor.

It will be appreciated that during the operation in a moving vehicle the output of an incline sensor is sensitive to vehicle accelerations due to conditions such as rough road vibration, which reduce its ability to accurately measure the vehicle tilt angle from sample to sample. However, the output of an incline sensor can be averaged over a long period of time to generate an accurate average vehicle tilt angle. Therefore the incline sensor by itself is generally suitable for measuring an accurate average vehicle tilt angle, but is not generally suitable for measuring the vehicle tilt angle during a relatively fast event such as a vehicle roll over.

It will also be appreciated that an angular rate sensor output is relatively immune to the accelerations from vehicle vibrations, and that integrated angular rate sensor output is very accurate during a relatively fast event such as a vehicle roll over. On the other hand, drift in the angular rate sensor output and subsequent integration error accumulations can cause drift errors in the calculated angular rate sensor angle. Consequently, the angular rate sensor by itself is suitable for measuring the change in angle and the angular rate during a relatively fast event such as a vehicle roll over, but is not generally suitable for measuring the vehicle tilt angle over longer periods of time.

A roll sensor according to the present invention compensates for the angular rate sensor angle drift error with an incline sensor output during vehicle operation. The CPU 160 records the outputs from the angular rate sensor 150 and the incline sensor 140 at a sample rate S, typically between 25 and 200 times per second. The change in vehicle tilt angle during one sample period can be calculated by dividing the calculated angular rate for that sample by the sample rate S.

$$\Delta A = \omega / S \quad (6)$$

where $\Delta A$ is the change in angle in degrees for one sample, $\omega$ is the angular rate in degrees per second, and S is the sample rate in samples per second. The new vehicle tilt angle after the first sampling period can be calculated by adding the change in angle to the initial tilt angle as previously calculated by the CPU 160 from the incline sensor 140 and stored in memory:

$$A(1) = \Delta A(1) + A(0) \quad (7)$$

where $A(1)$ is the calculated angle at sample 1, $\Delta A(1)$ is the change in angle in degrees during sample 1 as calculated in equation 4 above, and $A(0)$ is the initial tilt angle. Subsequent vehicle tilt angles can be calculated by adding the change in angle to the previously calculated angular rate sensor angle:

$$A(n) = \Delta A(n) + A(n-1) \quad (8)$$

where n is the current sample number and n−1 is the previous sample number. These calculations become subject to drift error described above unless the corrected by the incline sensor angle 140. Substituting the previously calculated vehicle tilt angle in equation 8 with a corrected vehicle tilt angle, which includes a portion of the incline sensor angle from the previous sample, gives a drift corrected angular rate sensor angle:

$$A_c(n-1) = [k^* A(n-1)] + [(1-k)^* A_i(n-1)] \quad (9)$$

Where $A_c(n-1)$ is the drift corrected vehicle titl angle for sample n−1, $A_i(n-1)$ is the incline sensor angle for sample n−1, and k is a weighting factor between 0 and 1. Substituting (9) into (8) gives:

$$A(n)=\Delta A(n)+[k^*A(n-1)]+[(1-k)^*A_i(n-1)] \quad (10)$$

The weighting factor k can be chosen for the amount of correction required by the incline angle sensor on the angular rate sensor angle, and for the amount of time the incline sensor is averaged. For example, if k=0.995 is chosen, then the angular rate sensor angle correction by the incline sensor is 1−k, or 0.005, times the incline sensor angle reading for each sample. It can be shown that for a constant value of incline sensor output, the angular rate sensor angle correction after 200 sample iterations would be approximately 0.63 times the incline sensor output. Thus the angle correction computation method, using weighting factor k, is an averaging method that effectively performs a low pass filter operation on the incline sensor angle, with a time constant Θ of:

$$\Theta=(1-k)/S \quad (11)$$

Thus the weighting factor k can be chosen so that during a vehicle roll event, which is normally less than five seconds in duration and more typically around one second in duration, the calculated angular rate sensor angle is primarily due to the angular rate sensor output integration. Additionally during normal vehicle operation, the calculated angular rate sensor angle is mainly due to an averaged incline angle sensor output, with the angular rate sensor integration drift effectively compensated.

It will be appreciated that the selection of weighting factor k is influenced several factors, including the drift characteristics of the angular rate sensor, the accuracy of the incline angle sensor, the expected duration of roll events for the vehicle, and the sensor sample rate.

In certain embodiments, weighting factor k is a variable, which changes during the normal operation of the vehicle. For example, if in one of these embodiments the CPU 160 measures the incline angle sensor output over time and calculations indicate low measurement variance, weighting factor k is adjusted to allow a greater influence from the incline angle sensor 140 in the angular rate sensor angle calculation. This improves the vehicle tilt angle measurement accuracy, for example, while the vehicle is operating on a smooth road. As the vehicle experiences a rough ride which increases the incline angle sensor output variance, the weighting factor k is adjusted to allow a greater influence from the angular rate sensor 150 in the angular rate sensor angle calculation.

Figure 8:
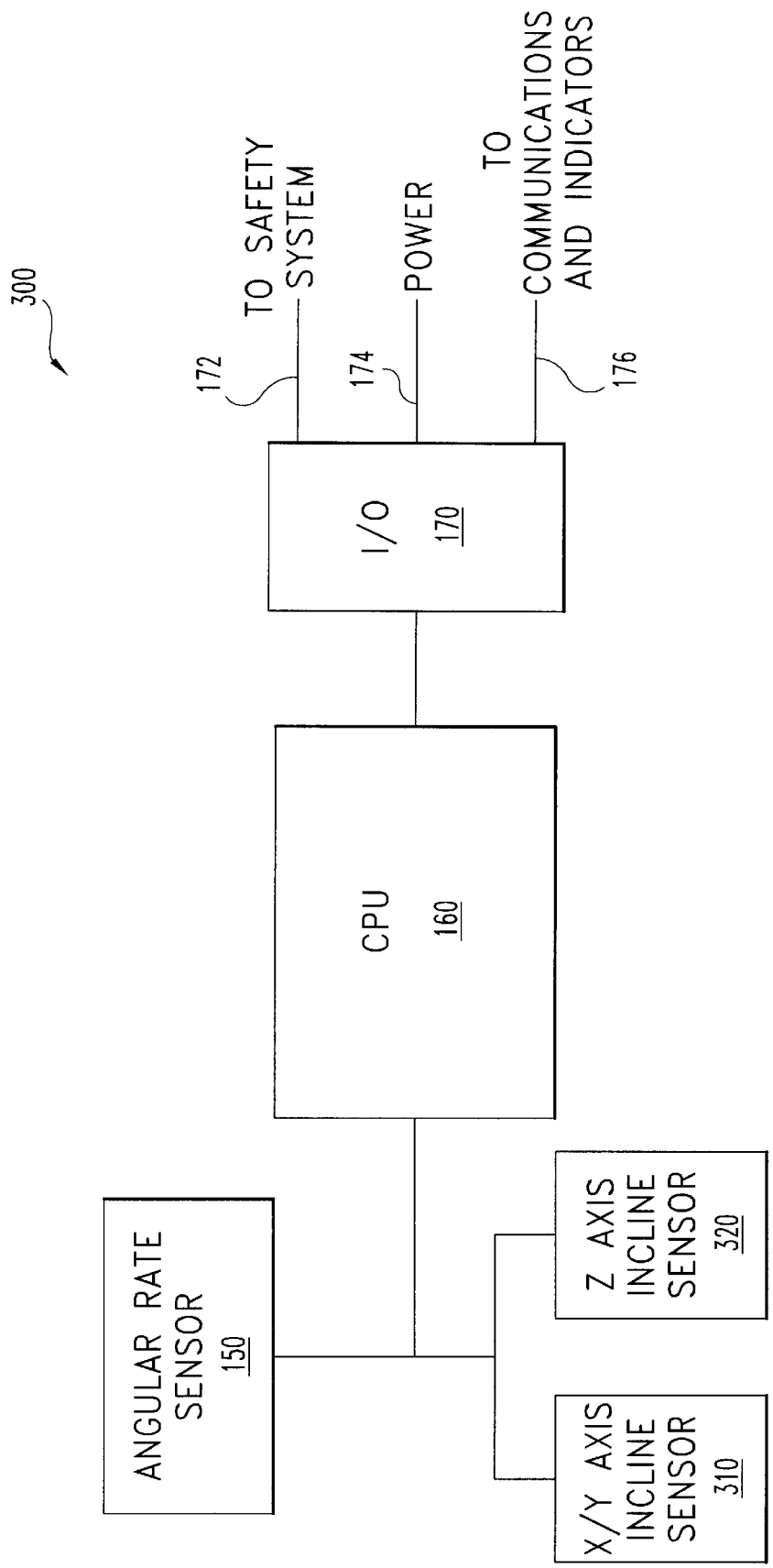
FIG. 8 is a block diagram of another embodiment of a roll sensor system useful in connection with a safety system.

Referring now to FIG. 8, there is shown another embodiment of the present invention, indicated generally at 300, wherein an incline sensor angle is derived that is used to compensate for drift in the angular rate sensor 150. In the embodiment of FIG. 8 the incline sensor 140 is replaced by an X/Y incline sensor 310 and a Z incline sensor 320. The incline sensors 310 and 320 are used in combination to derive the current tilt of the vehicle, and to derive the error in the tilt calculation due to lateral acceleration. The X/Y incline sensor 310 is sensitive along either the X-axis or Y-axis (depending on the chosen roll axis of the vehicle) and the Z incline sensor is sensitive to the Z-axis of the vehicle. Incline sensors 310 and 320 may be accelerometers, as previously disclosed herein. Further as described above, a dual output accelerometer may be used (such as the ADXL202 sold by Analog Devices) so that accelerometer outputs representative of tilt along the X and Y axes of the land vehicle may be used, if desired. In such an embodiment, a second angular rate sensor (not shown) may also be included.

In the preferred embodiment, it is primarily desired to detect roll about the X-axis of the vehicle. In such an embodiment, the incline sensor 310 would be aligned to produce an output indicating an incline along the Y-axis of the vehicle.

Figure 9:
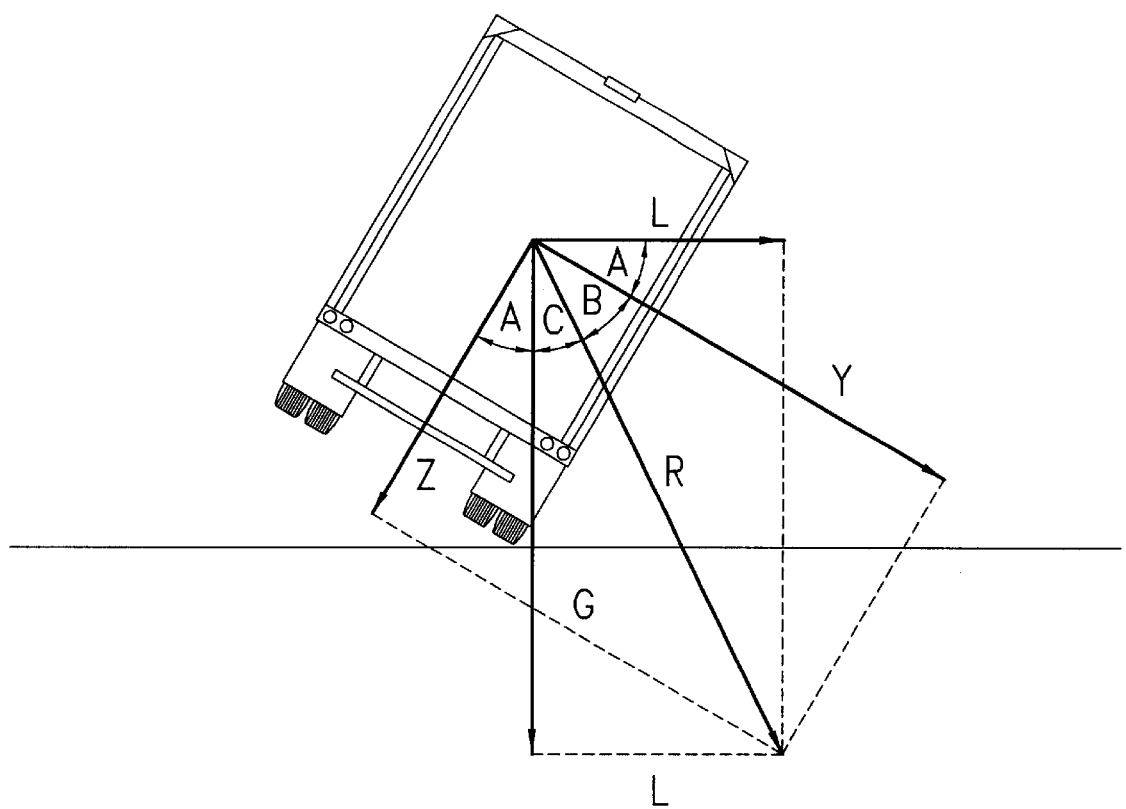
FIG. 9 is a diagram showing certain geometric relationships between a roll angle and detected angles.

Referring now to FIG. 9 in combination with FIG. 8, there is shown a vehicle that is tilted. If the lateral acceleration L is zero, the tilt angle A can be determined using the following formula:

$$A=\tan^{-1}(Y/Z) \quad (12)$$

Where Y is the acceleration measured along the Y-axis, and Z is the acceleration measured along the Z-axis.

If the vehicle is experiencing a lateral acceleration L the combination of lateral acceleration L and acceleration due to gravity G give the resultant acceleration vector R. This resultant R is also the vector resultant of Y and Z from the incline sensors 310 and 320. Given that G=1 g, the incline angle A can be calculated using the following formulas:

$$L=\pm\sqrt{Y^2+Z^2}-1 \quad (13)$$

$$A=\tan^{-1}(Y/Z)-\tan^{-1}L \quad (14)$$

It will be appreciated that the sign of lateral acceleration L cannot be determined by Y and Z from the incline sensors. In the presently preferred embodiment the lateral acceleration L calculation may be used as an error indicator to verify the incline angle A calculation accuracy. As the lateral acceleration L increases, the accuracy of the incline angle A calculation will decrease. When the lateral acceleration L exceeds a predetermined threshold the incline angle A calculation may temporarily pause its use for offset drift compensation. As the lateral acceleration L decreases below the threshold, the incline angle A will resume use for offset drift compensation. If desired, the lateral acceleration component thus calculated may be provided to other vehicle systems, such as anti-lock brakes, or other components additionally affected by lateral acceleration.

Additionally, the resultant acceleration R may be determined using the following:

$$R=\pm\sqrt{Y^2+Z^2} \quad (15)$$

In the presently preferred embodiment, the resultant acceleration R may be used to verify the proper functioning of incline sensors 310 and 320. Since acceleration due to gravity G is always a component of R, the long term average of resultant R must always be greater than or equal to 1 g. If the long term average of resultant R drops below 1 g, this indicates a malfunction of one or both incline sensors 310 or 320.

While the inventions have been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A land vehicle roll sensor system for detecting a vehicle roll condition and for activating a safety system in response thereto, comprising:

an angular rate sensor sensitive around at least one roll axis of the vehicle, said angular rate sensor producing an angular rate output signal representative of an angular rate around said at least one roll axis;

an integrator, including an input and an output, said integrator receiving said angular rate output signal at said integrator input and integrating said angular rate output over time to produce an integrated angle;

a first incline sensor sensitive along at least one incline axis perpendicular to said at least one roll axis of the land vehicle, said at least one incline axis being one of the X-axis and the Y-axis of the land vehicle, said first incline sensor producing a first incline sensor output;

a second incline sensor, said second incline sensor being sensitive to the Z-axis of the land vehicle, said second incline sensor producing a second incline sensor output;

a processor connected to receive said integrated angle, said angular rate output signal, said first incline sensor output and said second incline sensor output and to calculate a current incline angle from said first and said second incline sensor outputs, said processor comparing said current incline angle with said integrated angle and adjusting said integrated angle to compensate for drift if the difference between said current incline angle and said integrated angle is greater than a predetermined amount, said processor additionally generating a safety system trigger signal if after the comparison, at least said integrated angle correlates to a desired safety system activation event; and at least one safety system deployment control unit operatively connected to receive said trigger signal from said processor and to activate the safety system based upon receipt of a trigger signal.

2. The land vehicle roll sensor system of claim 1, wherein said processor generates a safety system trigger signal if after the comparison, said drift compensated angular rate sensor angle and said angular rate correspond to a safety system trigger event.

3. The land vehicle roll sensor system of claim 2, wherein said roll axis is the X-axis of the land vehicle and said first incline axis is the Y-axis.

4. The land vehicle roll sensor system of claim 3, additionally, including a second angular rate sensor sensitive to the Y-roll axis of the vehicle, said second angular rate sensor producing a second angular rate output signal representative of an angular rate around said Y-roll axis, said second angular rate output signal additionally being provided to said integrator to produce a second integrated angle.

5. The land vehicle roll sensor system of claim 4, additionally, including a third incline sensor sensitive along the X-axis of the vehicle and producing an X-axis output, wherein a second current incline angle is generated by said processor using said second incline angle output and said X-axis output, and wherein the second integrated angle is adjusted to compensate for drift if the difference between said second current incline angle and said second integrated angle is greater than a predetermined amount, said processor additionally generating a safety system trigger signal if after the comparison, said second angular rate output signal and said second integrated angle correlate to a desired safety system activation event.

6. The land vehicle roll sensor system of claim 1, wherein said processor adjusts said integrated angle by the difference between said current incline angle and said integrated angle if the difference is greater than a predetermined amount.

7. The land vehicle roll sensor system of claim 1, wherein the current incline angle is calculated according to the formula $$\text{current incline angle} = 90 - (\cos^{-1}(1/\sqrt{Z^2+Y^2}) + \cos^{-1}(Y/\sqrt{Z^2+Y^2}))$$

wherein Y is an angle corresponding to said first incline sensor output and Z is an angle corresponding to said second incline sensor output.

8. A method of correcting drift in the output of an angular rate sensor used in a vehicle roll sensor system for detecting a land vehicle roll condition, for activating a safety system in response thereto, comprising:

(a) providing an angular rate sensor sensitive to motion around at least one roll axis of the land vehicle;

(b) providing a first incline sensor sensitive along at least one incline axis, said incline axis perpendicular to said at least one roll axis of the land vehicle (c) providing a second incline sensor sensitive to the Z-axis of the land vehicle;

(d) obtaining an output signal from the angular rate sensor representative of the angular rate of change around said roll axis;

(e) integrating said output signal representative of said angular rate over time to obtain an output signal representative of angular rate sensor angle;

(f) obtaining from said first and second incline sensors a signal representative of instantaneous tilt along said at least one incline axis;

(g) comparing said angular rate sensor angle to said instantaneous tilt angle to obtain a difference value;

(h) adjusting said angular rate sensor angle by at least a portion of said difference value to compensate for drift;

(i) determining if at least said drift compensated angular rate sensor angle corresponds to a safety system trigger event; and (j) generating a safety system trigger signal if it is determined in said determining step that a safety system trigger event has occurred.

9. The method of claim 8, wherein said determining step determines whether said drift compensated angular rate sensor angle and said angular rate corresponds to a safety system trigger event.

10. The method of claim 9, wherein said determining step (i) further includes the step of comparing said drift compensated angular rate sensor angle and said angular rate to a lookup table to generate said trigger signal if both said drift compensated angular rate sensor angle and said angular rate correspond to a trigger event on said lookup table.

11. The method of claim 10, wherein said adjusting step only occurs if said difference angle is greater than a predetermined threshold value.

12. The method of claim 11, wherein if said generating step does not generate a trigger signal steps (a)–(i) are repeated, and wherein said next time through said steps (a)–(i), said difference angle is converted to a difference rate and said output angular rate obtained in step (c) is adjusted by said difference rate to compensate for drift.

13. The method of claim 8, wherein said instantaneous tilt angle is calculated according to the formula $$\text{instantaneous tilt angle} = 90 - (\cos^{-1}(1/\sqrt{Z^2+Y^2}) + \cos^{-1}(Y/\sqrt{Z^2+Y^2}))$$

wherein Y is an angle corresponding to said first incline sensor output and Z is an angle corresponding to said second incline sensor output.

14. The method of claim 8, further comprising:

(k) obtaining from said first and second incline sensors a signal representative of the lateral acceleration of the vehicle; and (m) determining the accuracy of said current tilt angle based on the error due to said lateral acceleration.

15. The method of claim 14, further comprising:

(n) obtaining from said first and second incline sensors a signal representative of the resultant acceleration; and (o) determining the whether said first and second incline sensors are functioning correctly by comparing said resultant acceleration to predicted value.

16. A vehicle roll sensor system for detecting a land vehicle roll condition and for activating a safety system in response thereto, comprising:

an angular rate sensor aligned to be sensitive around at least the X-roll axis of the land vehicle, said angular rate sensor producing an angular rate sensor output signal, said angular rate sensor being prone to drift;

a first incline sensor sensitive along at least the Y-axis of the land vehicle, said incline sensor producing a first incline sensor output signal;

a second incline sensor sensitive to at least the Z-axis of the land vehicle, said incline sensor producing a second incline sensor output signal;

a processor connected to said angular rate sensor and to said first and second incline sensors, said processor receiving said angular rate sensor output signal and said first and second incline sensor output signals, wherein said processor processes said angular rate sensor output signal to obtain a signal representative of the angular rate of said angular rate sensor and an angular rate derived angle corresponding to said angular rate sensor output integrated over time;

wherein said processor additionally processes said first and second incline sensor signals to obtain a signal representative of a current incline angle along at least the Y-axis;

a comparator for periodically comparing the current incline angle with the angular rate sensor angle to obtain a difference angle value;

drift angle compensation circuitry to produce a vehicle roll angle by adjusting said angular rate sensor angle by said drift angle value, to compensate for said drift component of said angular rate sensor angle;

activation logic circuitry including comparison circuitry, said activation logic circuitry in communication with said drift angle compensation circuitry to receive at least said vehicle roll angle, wherein said activation logic circuitry activates the safety system if at least said vehicle roll angle is greater than a threshold roll angle value.

17. The vehicle roll sensor system of claim 16, wherein the current incline angle is calculated according to the formula $$\text{current incline angle} = 90 - (\cos^{-1}(1/\sqrt{Z^2+Y^2}) + \cos^{-1}(Y/\sqrt{Z^2Y^2}))$$

wherein Y is an angle corresponding to said first incline sensor output and Z is an angle corresponding to said second incline sensor output.

18. The vehicle roll sensor system of claim 17, wherein said processor generates a safety system trigger signal if after the comparison, said drift compensated angular rate sensor angle and said angular rate correspond to a safety system trigger event.

19. The vehicle roll sensor system of claim 18, wherein said processor determines the accuracy of said current Y-axis tilt angle based on the error due to lateral acceleration.

20. The vehicle roll sensor system of claim 19, wherein said processor determines whether said first and second incline sensors are functioning correctly by comparing said resultant acceleration to predicted value.

21. A land vehicle roll sensor system for detecting a vehicle roll condition and for activating a safety system in response thereto, comprising:

an angular rate sensor sensitive along at least one roll axis of the vehicle, said angular rate sensor producing an output signal representative of an agular rate around said at least one roll axis;

an integrator, including an input and an output, said integrator receiving said angular rate output at said integrator input and integrating said annular rate output over time to produce an angle output;

an incline sensor, including an input and an output, said incline sensor receiving said angle output at said incline sensor input and adjusting said angle output to produce a corrected angle output;

a processor connected to receive said corrected angle and said angular rate and to correlate said angular rate signal and said angle to determine if a safety system activation event has occurred, said processor generating a safety system trigger signal is said determined angular rate output and said determined angle output correlate to a desired safety system activation event;

at least one safety system deployment control unit operatively connected to receive said trigger signal from said processor and to activate the safety system based upon receipt of a trigger signal.

22. The system of claim 18, wherein said incline sensor is an accelerometer.

23. A vehicle roll sensor system for detecting a land vehicle roll condition and for activating a safety system in response thereto, comprising:

an angular rate sensor aligned to be sensitive around at least one roll axis of the land vehicle, said angular rate sensor producing an angular rate sensor output signal, said angular rate sensor output signal being prone to drift;

an incline sensor aligned to be sensitive along at least an axis perpendicular to said at least one roll axis, said incline sensor producing an incline sensor output signal;

a processor connected to said angular rate sensor and to said incline sensor, said processor receiving said angular rate sensor output signal and said incline sensor output signal, wherein said processor processes said angular rate sensor output signal to obtain a signal representative of the angular rate of said angular rate sensor and an angular rate derived angle corresponding to said angular rate sensor output integrated over time, said processor additionally processes said incline sensor signal to obtain a signal representative of the angle of incline along the at least one incline axis;

activation logic circuitry including comparison circuitry, said activation logic circuitry in communication with said drift angle compensation circuitry to receive at least said vehicle roll angle, wherein said activation logic circuitry activates the safety system if said angular rate sensor output and vehicle roll angle correlate to a desired safety system activation event;

wherein said processor calculates a drift-corrected angular rate sensor angle for a sample n according to:

$$A_c(n-1) = [k * A(n-1)] + [(1-k) * A_i(n-1)],$$

wherein $A_c(n-1)$ is the drift-corrected angular rate sensor angle for sample n−1, $A_i(n-1)$ is an incline sensor angle for sample n−1, and k is a weighting factor between 0 and 1.

24. The vehicle roll sensor system of claim 23, wherein the weighting factor k is varied as a function of stability in the incline sensor angle.

25. The land vehicle roll sensor system of claim 1, wherein the current incline angle is calculated according to the formula $$\text{current incline angle} = A = \tan^{-1}(Y/Z)$$

wherein Y is an angle corresponding to said first incline sensor output and Z is an angle corresponding to said second incline sensor output.

26. The method of claim 8, wherein said instantaneous tilt angle is calculated according to the formula $$\text{instantaneous tilt angle} = A = \tan^{-1}(Y/Z)$$

wherein Y is an angle corresponding to said first incline sensor output and Z is an angle corresponding to said second incline sensor output.

27. The vehicle roll sensor system of claim 16, wherein the current incline angle is calculated according to the formula $$\text{current incline angle} = A = \tan^{-1}(Y/Z)$$

wherein Y is an angle corresponding to said first incline sensor output and Z is an angle corresponding to said second incline sensor output.

* * * * *